Feb. 24, 1959 E. M. ROSCHKE 2,875,268

SUBSCRIPTION TELEVISION SYSTEM

Filed Oct. 18, 1952 3 Sheets-Sheet 1

ERWIN M. ROSCHKE
*INVENTOR.*

BY *Francis W. Crotty*

HIS ATTORNEY.

ERWIN M. ROSCHKE
*INVENTOR.*

BY Francis W. Crotty

HIS ATTORNEY.

ERWIN M. ROSCHKE
*INVENTOR.*

BY Francis W. Crotty

HIS ATTORNEY.

United States Patent Office 2,875,268

Patented Feb. 24, 1959

2,875,268

SUBSCRIPTION TELEVISION SYSTEM

Erwin M. Roschke, Des Plaines, Ill., assignor to Zenith Radio Corporation, a corporation of Delaware Application October 18, 1952, Serial No. 315,457

2 Claims. (Cl. 178—5.1)

Figure 1:
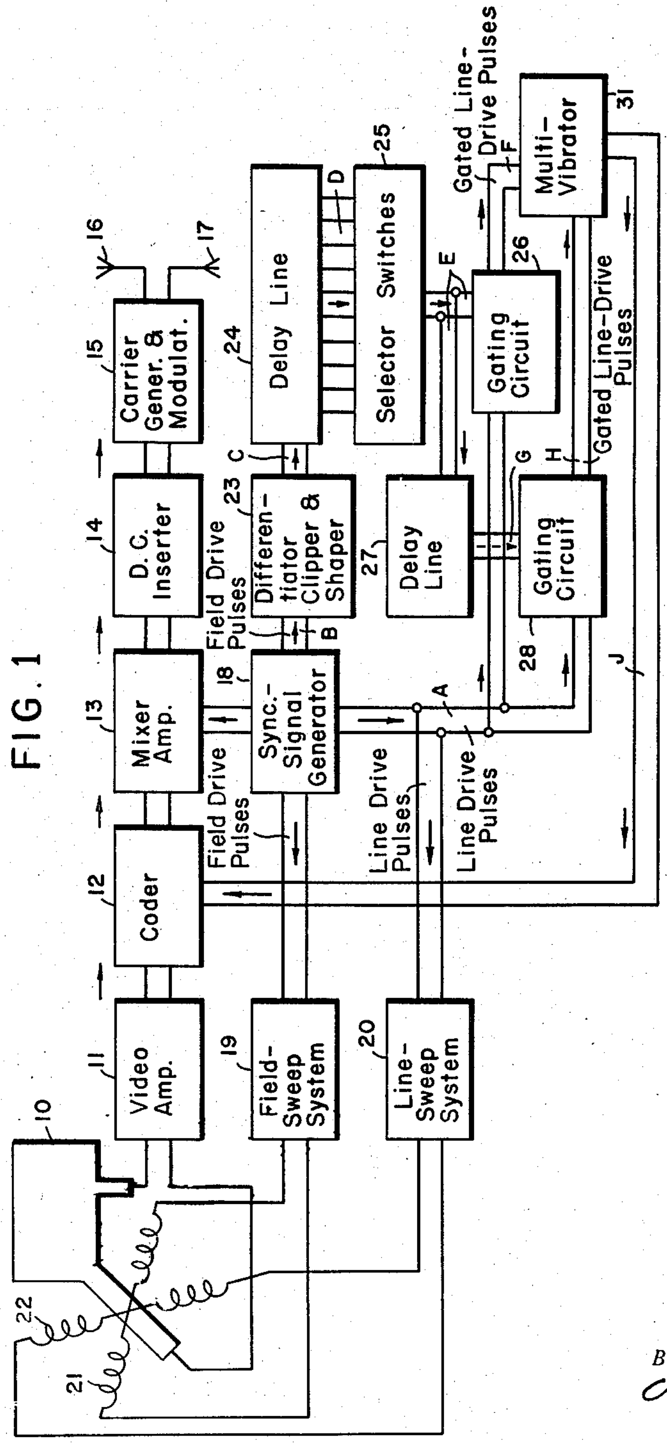

This invention relates to subscription television systems in which a television signal is distributed in coded form for use only in subscriber receivers having appropriate decoding apparatus actuated in accordance with the coding schedule of the telecast.

Since the invention may be practiced in either a transmitter or receiver the term "encoding" has been used herein in its generic sense to encompass either coding at the transmitter or decoding at the receiver.

Subscription television systems, as such, are already known in the art, being disclosed and claimed for example in Patent 2,510,046 to Ellett and in Patent 2,547,598 to Roschke, both of which are assigned to the present assignee. In these prior systems, coding is accomplished by altering some characteristic of the television signal during spaced intervals which, for example, may have a duration corresponding to several field-trace intervals and a time separation also corresponding to one or more field-trace intervals.

In one embodiment of the Roschke system the relative timing of the video and synchronizing components of the television signal is altered during spaced operating intervals and a key signal is distributed to subscriber receivers to identify the actual times of occurrence of such intervals. Where such signal alterations take place after one or more fields, the coding process may be characterized as occurring at a "slower-than-field" rate. It is desirable in certain applications to employ "faster-than-field" coding, that is, coding in which the alterations of the subscription signal occur at a faster-than-field rate. This has the advantage of increasing the coding complexity and reducing the possibility of unauthorized deciphering and utilization of the telecast.

The present invention is especially directed to an improved type of subscription television system characterized by faster-than-field coding and arranged for such flexibility as to render pirating or unauthorized use of the subscription telecast exceedingly difficult.

It is accordingly, an object of the present invention to provide a new and improved subscription television system in which the coding schedule exhibits a high degree of complexity.

A further object of the invention is to provide such an improved system in which mode changes of the transmitted signal occur at a relatively high, faster-than-field, rate to render unauthorized decoding extremely difficult.

Another object of the invention is to provide improved encoding apparatus for use at the transmitter or receiver of a subscription television system for achieving faster-than-field coding.

The encoding arrangement, featured in the present invention, may be employed in either the transmitter or receiver portion of a television system for translating a television signal including video components as well as recurring line-synchronizing components and field-synchronizing components. The arrangement comprises an encoding device for varying the operating mode of the system effectively to encode the television signal. It further includes a multiple-pulse signal generator for developing during each operating cycle a plurality of pulses at intervals commensurate with the separation between the line-synchronizing components and having a period of operation less than the period corresponding to the time separation of the field-synchronizing components. There are a series of output terminals for the generator for individually and selectively deriving one of the plurality of pulses in any operating cycle of the generator. A selector mechanism is coupled to the output terminals for selectively rendering any chosen combination of the terminals effective during a subscription program and in accordance with an encoding schedule assigned to the program. A control circuit is provided for actuating the encoding device and has two stable operating conditions in each of which the encoding device establishes a different operating mode in the system. Gating means are included for gating in those of the line-synchronizing components occurring in time coincidence with the pulses presented at the effective ones at the output terminals. There are means for utilizing the line-synchronizing components gated in to change the control circuit from a first to a second one of the operating conditions. Finally, means are included for restoring the control circuit to the first operating condition.

Figure 2:
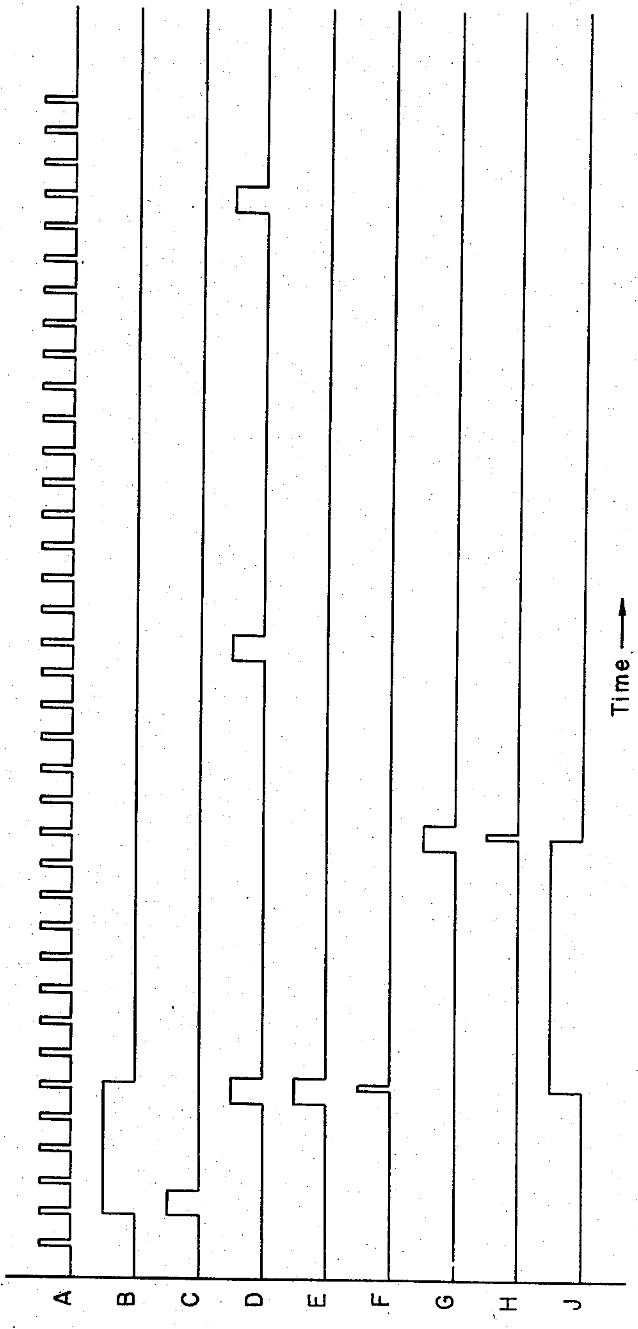
Figure 3:
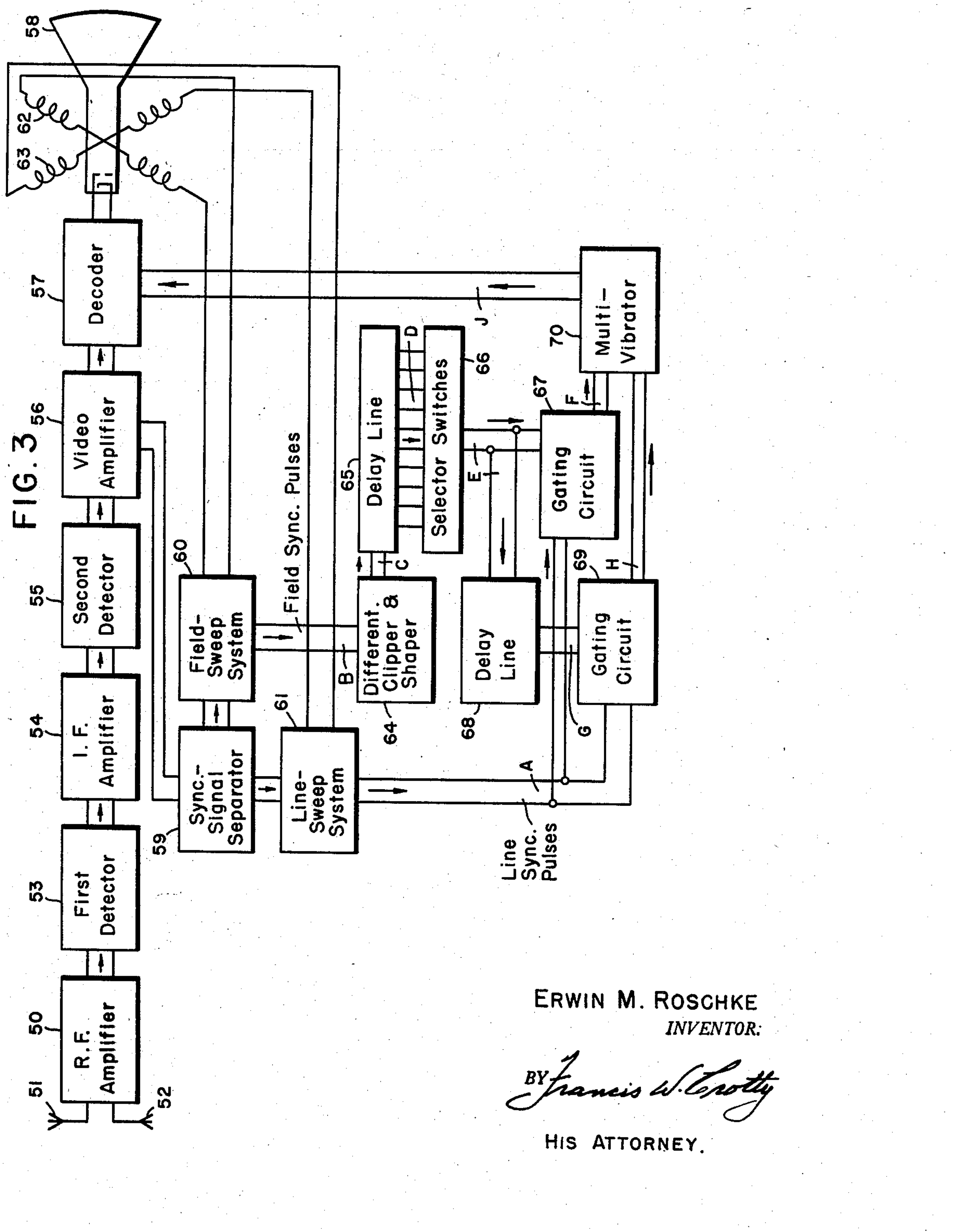

The features of this invention which are believed to be new are set forth with particularity in the appended claims. The invention, together with further objects and advantages thereof, may best be understood, however, by reference to the following description when taken in conjunction with the accompanying drawings, in which:

Figure 1 is a schematic diagram of a subscription television transmitter constructed in accordance with the invention, Figure 2 comprises a family of curves used in explaining the operation of the transmitter of Figure 1, and, Figure 3 is a schematic diagram of a receiver for utilizing the subscription television signal from the transmitter of Figure 1.

The transmitter of Figure 1 comprises a cathode-ray picture-converting device 10 which may be an iconoscope, image-orthicon or other well-known type. The output terminals of device 10 are coupled through a video amplifier 11 and a coder 12 to a mixer amplifier 13. The coder may be constructed in accordance with the teachings of copending application Serial No. 243,039 of Robert Adler, filed August 22, 1951 and issued August 7, 1956 as Patent 2,758,153, entitled "Subscription Television System" and assigned to the present assignee.

More specifically, coder 12 may comprise a beam-deflection tube having a pair of output circuits to be selectively coupled into the video channel as the beam is deflected from one to the other of two segmental anodes coupled respectively to such output circuits. One of the output circuits includes a time-delay network so that the timing of the video components relative to the synchronizing components varies as the beam of the deflection tube is switched between its anodes. This switching effect is accomplished by means of a beam-deflection control or actuating signal applied to coder 12, as explained hereinafter. Such intermittent variations in the timing of the video and synchronizing components effectively codes the television signal since conventional television receivers, not equipped with suitable decoding apparatus, depend upon an invariant time relation between the video and synchronizing components of a received signal for proper reproduction of the image intelligence.

Viewed from the standpoint of operating modes of the transmitter, a first mode is established during intervals in which the beam of the deflection tube of coder 12 is incident on that segmental anode which extends the video channel to mixer amplifier 13 without introducing any delay. In its first mode, the video components of the television signal may have the normal time relation with respect to the synchronizing components characteristic of commercial telecasting. During alternate operating intervals, the beam of the deflection tube impinges upon the remaining segmental anode and consequently introduces a time delay into the video channel, and the transmitter functions in a second mode. This mode differs from the first in that the video components have a modified or abnormal time relation with respect to the synchronizing components of the television signal. Coding is thus introduced by changing the operating modes of the transmitter in accordance with a coding schedule represented by amplitude variations of the deflection-control signal supplied to coder 12.

The output terminals of mixer 13 are coupled through a direct-current inserter 14 to a carrier-wave generator and modulator 15 having output terminals connected to a suitable antenna 16, 17. The transmitter also includes a synchronizing-signal generator 18 which supplies line- and field-synchronizing components and associated pedestal components to mixer 13. Generator 18 further supplies field-drive pulses to a field-sweep system 19 and line-drive pulses to a line-sweep system 20. The output terminals of the sweep systems are connected to the field-deflection elements 21 and line-deflection elements 22 associated with device 10. Generator 18 additionally supplies field-drive pulses to a unit 23 comprising a differentiator, a clipper, and a wave-shaper, and the output terminals of unit 23 are connected to a tapped delay line 24 terminated in its characteristic impedance to avoid reflections. This delay line is constructed in well-known manner such that the delay introduced between the application of an input pulse and its appearance at the other end is an interval slightly less than a field-trace interval. A series of spaced taps are provided on delay line 24 at points corresponding to various time intervals along the line.

The taps on delay line 24 are connected to a corresponding series of selector switches represented by the block 25, such as, manually operated toggle switches, to permit selective connection of any of the various taps to a normally closed gating circuit 26 and to a delay line 27. The output terminals of delay line 27 are connected to a normally closed gating circuit 28. Gating circuits 26, 28 have other input terminals connected to synchronizing-signal generator 18 to receive line-drive pulses therefrom and have output terminals connected to separate input terminals of a multivibrator 31. This multivibrator is of the flip-flop type having two stable operating conditions; pulses translated by gating circuit 26 trigger it from one operating condition to the other and pulses translated by gating circuit 28 trigger it back to its original operating condition. The output terminals of the multivibrator are connected to coder 12 to actuate the coder.

In operation, picture-converting device 10 develops video-frequency components representing the program information, and these components are amplified in amplifier 11 and supplied through coder 12 to mixer 13 wherein they are mixed with the usual synchronizing and blanking components from generator 18. Synchronizing-signal generator 18 supplies line-drive pulses (curve 2A) and field-drive pulses (curve 2B) to sweep systems 20 and 19 to synchronize these systems and thus the line and field scansions of device 10. The generator also supplies field-drive pulses to unit 23 which by differentiating, clipping and shaping develops a pulse of the wave form shown in curve 2C. Each such pulse (only one is shown in the illustration) has its leading edge in time coincidence with the leading edge of a corresponding field-drive pluse, but is of a shorter time duration. The pulses from unit 23 are impressed on the input terminals of delay line 24 and appear at the other end of the line after a delay slightly shorter than the field-trace interval, that is, slightly less than the time separation of successive pulses applied to the delay line.

Each pulse impressed on delay line 24 appears at the several taps thereof with various delays in accordance with the disposition of the taps along the device. The time differential between the appearance of an input pulse at successive taps may have any value selected within the capabilities of the line. It should be noted, however, that for proper operation of the system, as will be made apparent hereinafter, a pulse must appear at any given tap in substantial time coincidence with a line-drive pulse if it is to affect the coding schedule of the transmitter. Any arrangement of taps may be employed and may, for example, be so chosen that effective pulses appear at successive taps with a time delay of 14 line-trace intervals, as shown in the illustration. The taps that are connected to gating circuit 26 through selector 25, and usually only certain ones are so connected for any one particular subscription telecast, actuate the gate circuit to translate line-drive pulses therethrough to multivibrator 31.

In order that the invention may be easily understood, the operation of the system will initially be considered by assuming only one tap is connected to gating circuit 26 and, therefore, only one pulse is applied thereto. Gating circuit 26 is thus opened and assuming this occurs in time coincidence with the application of a line-drive pulse, such pulse is permitted to pass through to multivibrator 31. The multivibrator is therefore triggered from its original operating condition to the other or second operating condition. Multivibrator 31 can only be shifted from its first to its second operating condition by line-drive pulses passing through gating circuit 26, and not vice-versa; however, it will be shown hereinafter that multivibrator 31 is always in its first operating condition at the time a line-drive pulse is translated thereto via gating circuit 26.

Returning now to the particular pulse that opened gating circuit 26, it is apparent that this pulse is also applied to delay line 27 for delayed application to gating circuit 28. The pulse therefore opens gating circuit 28 at a somewhat later time than the opening of gating circuit 26. Assuming that gating circuit 28 is opened in time coincidence with the application of some succeeding line-drive pulse, that pulse is permitted to pass through the gating circuit to multivibrator 31. The multivibrator is thus shifted from its second operating condition to its first operating condition by a line-drive pulse applied thereto via gating circuit 28 and, therefore, is returned to its original condition. It may be mentioned here that the system is so arranged that multivibrator 31 is positioned back to its first operating condition before another pulse from a succeeding tap of line 24 is applied to gating circuit 26 although the delay of line 27 may cause the multivibrator to remain in its second operating condition for several line-trace intervals, any number less than the time separation of pulses at successive taps of line 24.

The invention will now be specifically considered in accordance with the particular illustration. The input pulse to line 24, shown in curve 2C, may, for example, appear at three of the taps at the times shown in curve 2D. If those three taps are connected by means of selector switches 25 to gating circuit 26, that circuit opens each time any such pulse appears. However, for purposes of illustration, it will be assumed that only one tap (of the three in question) is connected to gating circuit 26 and therefore at the time a pulse appears at that tap (curve 2E) the gating circuit is opened. It should be pointed out that the particular setting of selector switches 25 and thus the combination of taps of line 24 coupled to gating circuit 26 is determined entirely by the coding schedule to be employed at the transmitter for the specific subscription telecast. Returning now to the specific illustration, gating circuit 26 is thus conditioned to translate one of the line drive pulses (curve 2F) to multivibrator 31, thereby triggering it from its first stable operating condition to its second operating condition (curve 2J). The pulse applied to circuit 26 is also translated and delayed via delay line 27 (comparing curves 2G and 2E) to gating circuit 28, conditioning that circuit to translate a subsequent line-drive pulse (curve 2H) to multivibrator 31. The multivibrator is therefore triggered back to its original or first operating condition (curve 2J). In the specific illustrated example, the delay of line 27 corresponds to eight line-trace intervals (comparing curves 2F and 2H) so that in each instance the multivibrator is returned to its original or first operating condition after a delay of eight line intervals but before the pulse traversing delay line 24 appears at a succeeding tap thereof.

This actuation of multivibrator 31 between its stable conditions produces a square wave output as shown in curve 2J which is applied as a deflection-control signal to coder 12 to effect mode changes, as hereinbefore explained, in an irregular fashion. The coder is operated each time the actuating signal undergoes an amplitude excursion and thereby alters the timing of the video components supplied to mixer 12 effectively to code the television signal.

The receiver of Figure 3 comprises a radio-frequency amplifier 50 having input terminals connected to an antenna circuit 51, 52 and output terminals coupled through a first detector 53 and an intermediate-frequency amplifier 54 to a second detector 55. Detector 55 is connected to a video amplifier 56 which, in turn, is coupled through a decoder 57 to the input electrodes of a cathode-ray image-reproducing device 58. Decoder 57 may be similar in construction to coder 12 at the transmitter, with the polarity of its connections to the multivibrator inverted so that it may operate in a complementary fashion in order to compensate for the aforesaid timing variations in the video components of the transmitted television signal.

Video amplifier 56 is also connected to a synchronizing-signal separator 59 which, in turn, is connected to a field-sweep system 60 and to a line-sweep system 61. The output terminals of the sweep systems are connected to the field- and line-deflection elements 62 and 63 associated with device 58. Field-sweep system 60 is also connected to a differentiator-clipper-shaper network 64 having output terminals connected to a multiple-pulse signal generator or delay device 65. Delay device 65 is constructed similarly to delay device 24 at the transmitter and imparts the identical time delay to pulses applied thereto. Moreover, delay device or line 65 is provided with a series of taps that are positioned along the line identically as the position of the taps on delay line 24. The taps on delay line 65 are connected to a corresponding series of selector switches, indicated by the block 66 and similar to selector switches 25 at the transmitter, and these switches are connected to normally closed gating circuit 67 and a delay line 68. Delay line 68 imposes a time delay on the pulses translated thereby, which is equal to the time delay exhibited by delay line 27 at the transmitter, and impresses these delayed pulses on a normally closed gating circuit 69. The other input terminals of gating circuits 67 and 69 are connected to line-sweep system 61 to derive line-synchronizing pulses, and the output terminals of the gating circuits are connected to separate input terminals of a multivibrator 70 similar to multivibrator 31 at the transmitter; the output terminals of mulivibrator 70 are connected to decoder 57.

The television signal from the transmitter of Figure 1 is intercepted by antenna 51, 52, amplified in amplifier 50 and heterodyned to the selected intermediate frequency of the receiver in first detector 53. The resulting intermediate-frequency signal is amplified in intermediate-frequency amplifier 54 and detected in second detector 55 to produce a composite video signal. The video signal is amplified in amplifier 56 and supplied through decoder 57 to the input electrodes of image reproducer 58 to control the intensity of the cathode-ray beam therein in well-known fashion.

The decoding circuits at the receiver are identical to that at the transmitter so that a proper setting of the selector switches permits decoding of the received video signal. Field-synchronizing pulses are applied to the differentiator-clipper and shaper circuit and the resulting pulses are supplied to the delay line. The pulses thus appearing at the selected taps operate the gating circuit so that the succeeding line synchronizing pulses are translated therethrough to operate the multivibrator, which in turn operates the decoder in a complementary fashion to that at the transmitter effectively to decode the signal.

Specifically, the synchronizing components of the television signal are separated in synchronizing-signal separator 59 and supplied to sweep systems 60 and 61 to synchronize the field- and line-scansion of device 58 with the received television signal. Field-synchronizing pulses are derived from sweep system 60 and applied to differentiator clipper and shaper unit 64 to produce pulses, such as the one shown in curve 2C, that are applied to delay line 65. Each pulse impressed thereon appears at the taps of the delay line as at the transmitter. When the selector switches 66 are set to correspond with the setting of the switches 25 at the transmitter, pulses, such as the one shown in curve 2E, are supplied to gating circuit 67 and delay line 68, and delayed pulses, such as the one shown in curve 2G, are supplied to gating circuit 69. This enables the line-synchronizing pulses from sweep system 61 to actuate multivibrator 70 coincidently with the actuation of multivibrator 31 at the transmitter. Multivibrator 70, therefore, supplies an actuating signal to decoder 57 having properly timed amplitude excursions to operate the decoder in time coincidence with the actuation of the coder at the transmitter. The receiver functions to compensate for the variations in the television signal enabling device 58 to reproduce the image intelligence represented thereby.

It is evident that the coding schedule of the television signal may be varied at will merely by altering the setting of switches 25 at the transmitter and, thus the selection of taps on delay line 24 to be connected to gating circuit 26. This renders the coding schedule extremely flexible and enables it to be altered at frequent intervals, for example, at the end of each program. Should a subscriber desire to view an ensuing program he must change the setting of corresponding switches at his receiver. Information concerning the setting of such switches for any particular program may be obtained from a distribution center at an appropriate cost. Thus, not only may the secrecy aspects of the system be increased by frequent changes of the coding schedule; but also changes may be made on a fair basis, the subscriber paying only for programs actually requested and viewed.

The invention provides, therefore, a subscription television system in which coding of the television signal may proceed at a faster-than-field rate since actuation of the coding and decoding devices may occur many times during each field-trace period. Such coding is carried out in the present system by means of the disclosed instrumentalities responding to the line-synchronizing pulses so that precise registration is maintained between the operation of the coder at the transmitter and the decoders at authorized receivers.

It will be apparent from the foregoing description that delay line 24 of the transmitter and delay line 65 of the receiver are in the nature of and may be considered as multiple-pulse signal generators. The operating cycle of each such device, considered as a generator, corresponds with the time of travel from the signal applied to the input terminals to its absorption in the terminating impedance at the opposite end of the line. It will be understood that while a delay line, terminating in its characteristic impedance, has been illustrated as a particular embodiment of the multiple signal generator, other well-known devices may be employed with equal facility to supply time-separated pulses to a plurality of output terminals rendered effective in chosen combination by the operation of selector switches 25 and 66.

While a particular embodiment of the invention has been shown and described, modifications may be made, and it is intended in the appended claims to cover all such modifications as fall within the true spirit and scope of the invention.

I claim:

1. In a subscription television system for translating a television signal including video components as well as recurring line-synchronizing components and field-synchronizing components, an encoding arrangement comprising: an encoding device for varying the operating mode of said system effectively to encode said signal; a multiple-pulse signal generator for developing during each operating cycle a plurality of pulses at intervals commensurate with the separation between said line-synchronizing components and having a period of operation less than the period corresponding to the time separation of said field-synchronizing components; a series of output terminals for said generator for individually and selectively deriving one of said plurality of pulses in any operating cycle of said generator; a selector mechanism coupled to said output terminals for selectively rendering any chosen combination of said terminals effective during a subscription program and in accordance with an encoding schedule assigned to said program; a control circuit for actuating said encoding device and having two stable operating conditions in each of which said encoding device establishes a different operating mode in said system; gating means for gating in those of said line-synchronizing components occurring in time coinsidence with the pulses presented at the effective ones of said output terminals; means for utilizing the line-synchronizing components gated in to change said control circuit from a first to a second one of said operating conditions; and means for restoring said control circuit to said first operating condition.

2. In a subscription television system for translating a television signal including video components as well as recurring line-synchronizing components and field-synchronizing components, an encoding arrangement comprising: an encoding device for varying the operating mode of said system effectively to encode said signal; a multiple-pulse signal generator for developing during each operating cycle a plurality of pulses at intervals commensurate with the separation between said line-synchronizing components and having a period of operation less than the period corresponding to the time separation of said field-synchronizing components; a series of output terminals for said generator of individually and selectively deriving one of said plurality of pulses in any operating cycle of said generator; a selector mechanism coupled to said output terminals for selectively rendering any chosen combination of said terminals effective during a subscription program and in accordance with an encoding schedule assigned to said program; a control circuit for actuating said encoding device and having two stable operating conditions in each of which said encoding device establishes a different operating mode in said system; gating means for gating in those of said line-synchronizing components occurring in time coincidence with the pulses presented at the effective ones of said output terminals; means for utilizing the line-synchronizing components gated in to change said control circuit from a first to a second one of said operating conditions; and means for restoring said control circuit to said first operating condition after an interval corresponding to an integral number of line-scanning periods but less than the time separation of pulses appearing at successive ones of said output terminals of said generator.

References Cited in the file of this patent

UNITED STATES PATENTS

| | | |
|---|---|---|
| 2,414,101 | Hogan et al. | Jan. 14, 1947 |
| 2,472,774 | Mayle | June 7, 1949 |
| 2,510,046 | Ellett et al. | May 30, 1950 |
| 2,541,076 | Labin et al. | Feb. 13, 1951 |
| 2,636,936 | Goldsmith | Apr. 28, 1953 |
| 2,656,407 | Herrick et al. | Oct. 20, 1953 |
| 2,757,226 | Zworykin | July 31, 1956 |